Figure 1:
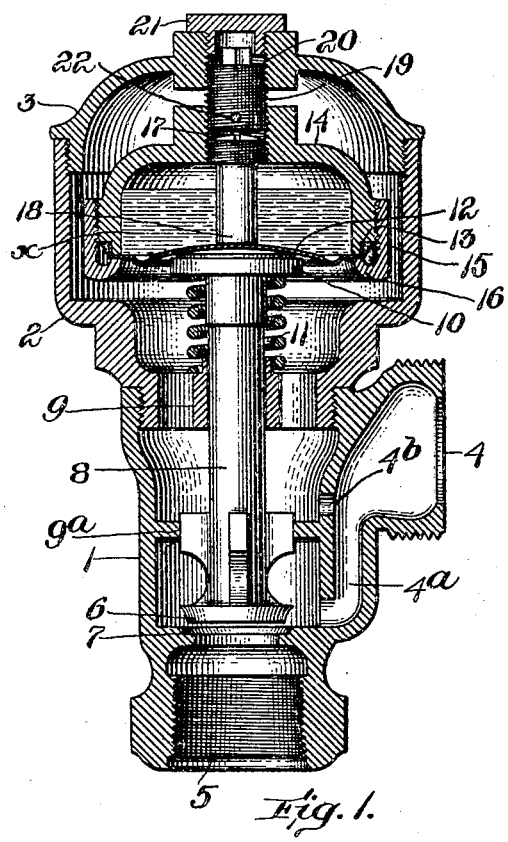

No. 767,200. PATENTED AUG. 9, 1904.
W. E. BARNES.
THERMOSTATIC VALVE.
APPLICATION FILED MAY 17, 1904.
NO MODEL.

Witnesses:
Josephine H. Ryan
Grace P. Gibbons

Inventor:
Walter Edmond Barnes
by Roberts & Mitchell
Attorneys.

No. 767,200. Patented August 9, 1904.

UNITED STATES PATENT OFFICE.

WALTER ESMOND BARNES, OF MALDEN, MASSACHUSETTS, ASSIGNOR TO THERMOGRADE VALVE COMPANY, OF BOSTON, MASSACHUSETTS, A CORPORATION OF MAINE.

THERMOSTATIC VALVE.

SPECIFICATION forming part of Letters Patent No. 767,200, dated August 9, 1904.

Application filed March 17, 1904. Serial No. 198,584. (No model.)

*To all whom it may concern:*

Be it known that I, WALTER ESMOND BARNES, a citizen of the United States, and a resident of Malden, in the county of Middlesex and State of Massachusetts, have invented new and useful Improvements in Thermostatic Valves, of which the following is a specification.

My invention relates to thermostatic valves adapted for use at the lower or discharge end of a radiator in a steam-heating system. Valves of this character comprise, essentially, a thermostat which controls the valve proper, arranged in a chamber communicating with the radiator in such manner that so long as the thermostat is under the influence of the steam in the steam-heating system the valve will be held closed; but when sufficient water of condensation collects in the valve-chamber to cut the thermostat off from the steam the thermostat acts automatically, by reason of the change of temperature, to open the valve, permitting the water to be discharged. When the water has left the thermostatic valve and the steam again has access to the thermostat, the latter again acts automatically to close the valve.

The object of my invention is to provide a thermostatic valve of this character which will operate more promptly and positively upon the appearance of water in the valve than has heretofore been the case.

A further object of my invention is to provide a valve in which a small amount of water condensed by the radiator will be sufficient to seal the thermostatic chamber from the influence of the steam and subject the thermostat to the influence of the water of condensation, thus causing the valve to open quickly and positively.

A further object of my invention is to provide means for quickly and conveniently cleaning the valve proper and valve-seat from any grit or the like which tends to accumulate there and to cause the valve to leak without opening or dismembering the device.

A still further object of my invention is to prevent the loss of any steam from the radiator through the valve after the discharge of the water by causing the valve to close promptly before the steam can reach the valve proper.

A still further object of my invention is to provide improved means for accurately and nicely adjusting the thermostat to secure its greatest efficiency in operating the valve proper under any specific conditions under which the device may be used.

It is my further object to provide an otherwise improved device of the character described.

Figure 2:
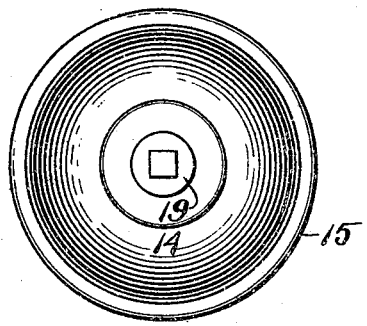

In the accompanying drawings, which illustrate an embodiment of my invention, Figure 1 is a central longitudinal sectional view of my thermostatic valve. Fig. 2 is a plan view of the thermostatic chamber hereinafter described.

The body of the valve, as herein shown, is made in three parts, comprising a main part 1, a chamber 2 for the thermostat, and a cap 3. The number of parts is not essential; but the advantages of this construction will presently be pointed out. The main part 1 is made with a steam and water inlet 4 and a water-outlet 5, the latter controlled by the valve proper, 6, arranged to close upon valve-seat 7 to control the valve-outlet 5. The steam and water inlet 4 communicates with the interior of the valve-body through the restricted passage $4^a$, leading downward and constituting a trap, as shown. When the water of condensation accumulates in the trap, it cuts off the steam from the interior of the valve-body and causes the thermostat to operate, as hereinafter described. Valve 6 is carried by the valve-stem 8 at its lower end. The stem 8 is mounted to slide in guides or bearings 9 and $9^a$, provided upon the middle part 2 and the main part 1, respectively, of the body. The upper end of stem 8 is provided with a head 10. Surrounding the stem 8 is coil-spring 11, which bears against the head 10 and the projection or guide 9, thus holding the head 10 against diaphragm 12 of the thermostat.

The thermostat comprises a dome-shaped chamber 14, the bottom of which is closed by the diaphragm 12. This diaphragm is hermetically sealed to the chamber 14 in any suitable way, my preferred method being to provide the diaphragm with a perpendicular rim 13, set into a clearance or groove in the edge of the chamber and soldered thereto. The exterior of chamber 14 is threaded to engage an interiorly-threaded annulus 15, which is screwed onto said chamber. This annulus 15 is made with an inwardly-projecting reëntrant lip 16, between which and the rim of chamber 14 the diaphragm 12 is clamped near its edge. At its top chamber 14 is made with a tapped hole 17, into which is screwed an adjustable diaphragm-stop 18, which limits the upward or inward movement of diaphragm 12. The tapped hole 17 is also engaged by the lower end of a screw 19, which at its upper end engages a tapped hole 20, provided through the cap 3. The upper end of the tapped hole 20 is closed by a removable cap 21, so that access may be had to the upper end of screw 19. Thus after the parts of the valve are assembled cap 21 can be removed, and by turning screw 19 chamber 12 can be adjusted in order to provide for the desired range of movement of the valve proper. A pin 22, passing through the screw 19 and a hub at the top of chamber 14, prevents the screw from turning in the chamber 14 when the screw is turned to adjust the thermostat vertically.

Within the chamber 14 is a volatile fluid X, which expands and contracts under the influence of relative heat and cold. When expanded by the heat of the steam, it acts through diaphragm 12 to depress the valve-stem 8, overcoming the resistance of spring 11 and to close the valve 6 upon its seat. When the space within the valve-body surrounding the thermostat is cut off from the steam by the water of condensation which seals the inlet-port 4, as will presently be described, the temperature of the medium surrounding the thermostat is lowered and the resulting contraction of fluid X raises the diaphragm 12 and permits spring 11 to open valve 6 and to hold it open until the water has passed from the valve-body sufficiently to permit the steam from inlet 4 again to have access to the thermostat. In order that all parts of the surface of the thermostat, the top as well as the bottom, may be subjected to the influence of the contents of the valve-body, a space or passage is left between the annulus 15 and the interior of the part 2, whereby the contents of the valve-body may have access to all parts of the interior of the valve-body.

As thus far described the operation of the device is as follows: The steam entering the valve-body through the inlet 4 and trap $4^a$ fills the interior of the valve-body and surrounds the thermostat, raising the temperature of the volatile fluid X and causing the valve 6 to close upon its seat in the manner already described.

As the steam condenses in the radiator the water of condensation flows down through inlet 4 and into the trap $4^a$. The passage at $4^a$ is so small that a very small amount of water will close the same and cut the steam off from the interior of the valve-body. The temperature therein will begin to fall by the mere cutting off of the steam. In my device, however, as distinguished from other thermostatic valves the cooling is accelerated and the consequent action of the valve made more prompt by the following process: The steam confined within the valve-body by the sealing of trap $4^a$ immediately tends to condense, forming a partial vacuum within the body. This draws the water of condensation, which is steadily increasing within the radiator, into the valve-body, and being of much lower temperature than the steam the water causes the valve to act much more quickly than it would by an unassisted cooling off. The depth or vertical length of the duct composing the trap $4^a$ may be made as great as desired, and the longer it is the cooler the water will become and the swifter will be the action of the valve when the water is drawn into the body of the device. It will be seen, therefore, that the temperature at which the valve will automatically open may be regulated by the depth of the passage from inlet 4 to trap $4^a$ instead of by the tension or strength of the spring upholding the valve, as is common at present.

When the temperature within the device is so far reduced as to cause the valve to open, the water will be discharged until it has fallen below the opening of the duct or trap $4^a$. Steam will then be admitted again into contact with the thermostat and cause the valve to close. The valve as above described is perfectly operative and seviceable without the feature which I will now describe. This feature is, however, of much advantage in preventing waste of steam.

To insure the closing of the valve before all the water leaves the valve proper, and thus to guard against the escape therethrough of any steam whatsoever, I have provided an additional steam-inlet port $4^b$, opening into the valve-chamber at a point relatively higher than the inlet of duct $4^a$. The part of the valve-chamber and of the inlet-port 4 below the port $4^b$ thus constitutes a pocket within which the water can collect without cutting off the thermostat from the influence of the steam until the water rises above the port $4^b$. As soon as the level of the water rises sufficiently to close port $4^b$ against the passage of steam the thermostat acts to open the valve proper, as already described. As the water is discharged through valve 6 and falls below the port $4^b$, opening it to steam, the thermostat again operates to close the valve before all of the water has been discharged, so that no steam whatever will be lost, the water still remaining in the lower part of the device, constituting a seal for the valve.

Thus a thermostat which might not be quickly enough responsive to thermal changes to prevent the escape of some steam without the aid of a steam-inlet port located above the level of the valve proper will with the aid of such port close the valve before any steam reaches valve 6.

The port $4^b$ is preferably about on a level with the bottom of the radiator. (Not shown, but connected with the inlet 4.) The port $4^b$ will therefore be sealed by the water and cause the thermostat to act before the water can rise and collect within the radiator, thus keeping the radiator substantially free from water. With the form of construction in which there is no additional steam-inlet port $4^b$ the thermostat will operate to open the valve 6 when a smaller amount of water is collected, and therefore more quickly than is the case when the inlet-port $4^b$ is provided; but the valve will not close as quickly to prevent the loss of steam when the port $4^b$ is omitted as when it is present.

Referring now to the convenience and ease of cleaning the valve proper and valve-seat afforded by my construction, it has been found that the collection at the valve-seat of dirt, scale, core-sand, and the like from the interior of the radiators and pipes has been a source of much trouble. Particles which lodge upon the valve-seat not only tend to hold the valve open, and thus permit a constant leakage of steam, but also to wear out the valve and valve-seat and quickly to impair their efficiency. Hitherto it has been necessary to dismember the device or remove parts in order to take out the valve to clean the valve and valve-seat. In my improved device I have provided means for lifting the valve from the seat from without the device without dismembering the device at all, thus allowing the steam under the pressure within the system to blow through the valve and carry away dirt or the like which may have accumulated on the valve-seat. The means shown for accomplishing this consists in making that part of the valve-body which by means of the valve-stem supports and carries the valve proper adjustable with reference to the part of the valve-body which contains the valve-seat. An admirable mode of securing such adjustability is to provide a screw-joint, as shown, between the part 2 of the valve-body, which carries the valve proper, and the part 1, in which is located the valve-seat. By merely unscrewing part 2 a little way the valve 6 will be moved away from its seat to permit the steam to be blown through, and the operation may be effected without taking the valve apart in any way. Little or no steam will escape through the screw-joint during the short time necessary to perform the operation. Except for this cleaning feature the parts 1 and 2 could be made integral.

What I claim is—

1. A thermostatic valve comprising a body having a valve-chamber provided with a water-inlet port, and a water-outlet port, both communicating with the lower part of the chamber; a thermostat for operating the valve; and a steam-inlet port connecting the water-inlet with the valve-chamber at a point above the entrance of the water-inlet port, and controlled by the water in the valve-body.

2. A thermostatic valve comprising a valve-chamber provided with a water-inlet port 4, a duct leading downward therefrom and forming the trap $4^a$ and entering the lower part of the valve-chamber; a water-outlet port at the lower part of the valve-chamber; a steam-inlet port $4^b$ connecting the water-inlet port with the valve-chamber above the point of entrance of said duct; a valve for controlling the water-outlet port; and a thermostat for operating said valve.

3. In a thermostatic valve, in combination, a body provided with an inlet and an outlet; a valve controlling the outlet; a thermostat for operating the valve comprising an exteriorly-threaded fluid-holding vessel; an interiorly-threaded annulus screwed onto said vessel; a diaphragm clamped near its edge between the rim of the vessel and the annulus; and means connecting the vessel with the valve-body.

4. In a thermostatic valve, in combination, a body provided with an inlet and an outlet; a valve controlling the outlet; a thermostat for operating the valve comprising an exteriorly-threaded chamber; a diaphragm made with a perpendicular rim surrounding and soldered to the rim of the chamber; an interiorly-threaded annulus screwed onto the said chamber, between which and the rim of the chamber the diaphragm is clamped near its edge; and means connecting the chamber with the valve-body.

5. In a thermostatic valve, in combination, a body provided with an inlet and an outlet; a valve controlling the outlet; a thermostat for operating the valve comprising an exteriorly-threaded chamber; an interiorly-threaded annulus screwed onto said chamber; a diaphragm clamped near its edge between the chamber and the annulus; and a screw connecting said chamber with the valve-body to provide for supporting and adjusting the thermostat.

Signed by me at Boston, Massachusetts, this 11th day of March, 1904.

WALTER ESMOND BARNES.

Witnesses:
ROBERT CUSHMAN,
JOSEPH T. BRENNAN.